(12) United States Patent
Lefferts et al.

(10) Patent No.: US 6,755,404 B1
(45) Date of Patent: Jun. 29, 2004

(54) SPRING EYE SCARF GAP PROTECTOR DEVICE AND ASSOCIATED ELASTOMERIC BUSHING ASSEMBLY

(75) Inventors: Scott R. Lefferts, Fairview, PA (US); Chris E. Casbohm, Albion, PA (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 10/337,182

(22) Filed: Jan. 6, 2003

(51) Int. Cl.[7] ............................................. B60G 11/22
(52) U.S. Cl. ...................................... 267/281; 267/292
(58) Field of Search ................................ 267/281, 282, 267/292, 293, 294

(56) References Cited

U.S. PATENT DOCUMENTS

| | | | | |
|---|---|---|---|---|
| 5,013,166 A | * | 5/1991 | Domer | 384/220 |
| 5,688,054 A | * | 11/1997 | Rabe | 384/295 |
| 5,918,864 A | * | 7/1999 | Schafer | 267/140.12 |
| 6,241,225 B1 | * | 6/2001 | Krause | 267/292 |

* cited by examiner

Primary Examiner—Christopher P. Schwartz
(74) Attorney, Agent, or Firm—Edward F. Murphy III

(57) ABSTRACT

An elastomeric bushing assembly including a substantially cylindrical elastomeric bushing segment having a recessed channel manufactured into a portion of an outer surface thereof and a rigid member disposed within the recessed channel manufactured into the portion of the outer surface of the substantially cylindrical elastomeric bushing segment. The substantially cylindrical elastomeric bushing segment is configured such that it may be disposed within a first structure comprising an inner surface having edges defining a gap and the substantially cylindrical elastomeric bushing segment is configured such that it may receive a second structure comprising an outer surface. The substantially cylindrical elastomeric bushing segment is configured such that it may be disposed within the first structure comprising the inner surface having edges defining the gap such that the rigid member is substantially aligned and in direct contact with the edges defining the gap. The first structure may be, for example, a leaf spring comprising an inner surface having edges defining a scarf gap.

24 Claims, 4 Drawing Sheets

SPRING EYE SCARF GAP PROTECTOR DEVICE AND ASSOCIATED ELASTOMERIC BUSHING ASSEMBLY

FIELD OF THE INVENTION

The present invention relates generally to springs, such as leaf springs or the like, that have a gap, such as a scarf gap or the like, resulting from their manufacture and associated bushings or the like. More specifically, the present invention relates to a spring eye scarf gap protector device, an associated elastomeric bushing assembly, and associated methods.

BACKGROUND OF THE INVENTION

Springs, such as leaf springs or the like, typically have a gap, such as a scarf gap or the like, resulting from their manufacture. This gap is formed when the metal or other material of the spring is bent, shaped, or otherwise formed and the ends and/or surfaces of the spring come into contact with one another, such as when a spring eye is formed. This gap becomes problematic when a bushing or the like is disposed within the spring eye. Such bushings are typically made of an elastomeric material and, when disposed within the spring eye, the sharp, irregular edges of the gap may abrade or otherwise damage the bushing, detrimentally affecting its elastomeric and/or fatigue properties.

One possible solution to this problem is to dispose the bushing within a rigid sleeve or the like. This rigid sleeve may be made of a metal, such as steel, a plastic, a composite material, or the like. Both the bushing and the rigid sleeve are then disposed within the spring eye, the rigid sleeve protecting the bushing from the sharp, irregular edges of the gap. This solution, however, is itself problematic as it may make installation of the bushing in the spring eye more difficult, the bushing may be inadequately retained in the spring eye, the bushing may be allowed to rotate within the spring eye, or metal-to-metal contact, for example, may be otherwise undesirable.

Thus, what is needed is a device that protects the elastomeric bushing from the sharp, irregular edges of the gap in the spring eye, without the use of a rigid sleeve or the like. What is also needed is a device that is relatively simple and cost-effective to manufacture, install, and ship, alone or in combination with the bushing as part of an elastomeric bushing assembly.

BRIEF SUMMARY OF THE INVENTION

The spring eye scarf gap protector device of the present invention incorporates a rigid member into the elastomeric bushing described above. This rigid member, which may be made of a metal, such as steel, a plastic, a composite material, or the like, securely engages one or more recesses manufactured into the bushing. For example, the rigid member may be "snapped" or press-fit into and/or bonded with the one or more recesses. The resulting elastomeric bushing assembly may then be shipped to a customer or the like with the rigid member in place and installed into the spring eye of a leaf spring or the like. Upon installation, the elastomeric bushing bulges, accommodating the volume or space between an inner member or structure and the inner diameter of the spring eye. Advantageously, the elastomeric material adjacent to the rigid member applies compressive force to the rigid member, pushing it against the scarf gap of the spring eye. Thus, there is no elastomeric material in contact with the sharp, irregular edges of the scarf gap, preventing abrading or damage to the elastomeric bushing assembly.

In one embodiment of the present invention, an elastomeric bushing assembly includes a substantially cylindrical elastomeric bushing segment having a recessed channel manufactured into a portion of an outer surface thereof and a rigid member disposed within the recessed channel manufactured into the portion of the outer surface of the substantially cylindrical elastomeric bushing segment. The substantially cylindrical elastomeric bushing segment is configured such that it may be disposed within a first structure comprising an inner surface having edges defining a gap and the substantially cylindrical elastomeric bushing segment is configured such that it may receive a second structure comprising an outer surface. The substantially cylindrical elastomeric bushing segment is configured such that it may be disposed within the first structure comprising the inner surface having edges defining the gap such that the rigid member is substantially aligned and in direct contact with the edges defining the gap. In an alternative embodiment of the present invention, the elastomeric bushing assembly includes a plurality of substantially cylindrical elastomeric bushing segments each having a recessed channel manufactured into a portion of an outer surface thereof, wherein the recessed channels manufactured into the portion of the outer surface of each of the plurality of substantially cylindrical elastomeric bushing segments are substantially aligned. The first structure may be, for example, a leaf spring comprising an inner surface having edges defining a scarf gap.

In another embodiment of the present invention, a spring assembly includes a first structure comprising an inner surface having edges defining a gap, a substantially cylindrical elastomeric bushing segment disposed within the inner surface of the first structure, the substantially cylindrical elastomeric bushing segment having a recessed channel manufactured into a portion of an outer surface thereof, and a rigid member disposed within the recessed channel manufactured into the portion of the outer surface of the substantially cylindrical elastomeric bushing segment, wherein the rigid member is substantially aligned and in direct contact with the edges of the inner surface of the first structure defining the gap. The substantially cylindrical elastomeric bushing segment is configured such that it may receive a second structure comprising an outer surface. In an alternative embodiment of the present invention, the spring assembly includes a plurality of substantially cylindrical elastomeric bushing segments disposed within the inner surface of the first structure, the plurality of substantially cylindrical elastomeric bushing segments each having a recessed channel manufactured into a portion of an outer surface thereof, wherein the recessed channels manufactured into the portion of the outer surface of each of the plurality of substantially cylindrical elastomeric bushing segments are substantially aligned. The first structure may be, for example, a leaf spring comprising an inner surface having edges defining a scarf gap.

In a further embodiment of the present invention, a method for providing an elastomeric bushing assembly includes the steps of providing a substantially cylindrical elastomeric bushing segment, manufacturing a recessed channel into a portion of an outer surface of the substantially cylindrical elastomeric bushing segment, and disposing a rigid member within the recessed channel manufactured into the portion of the outer surface of the substantially cylindrical elastomeric bushing segment. The method also includes the steps of configuring the substantially cylindrical elastomeric bushing segment such that it may be disposed within a first structure comprising an inner surface having edges defining a gap and configuring the substantially cylindrical elastomeric bushing segment such that it may receive a second structure comprising an outer surface. The method further includes disposing the substantially cylindrical elastomeric bushing segment within the first structure comprising the inner surface having edges defining the gap such that the rigid member is substantially aligned and in direct contact with the edges defining the gap. In an alternative embodiment of the present invention, the method includes the step of providing a plurality of substantially cylindrical elastomeric bushing segments each having a recessed channel manufactured into a portion of an outer surface thereof, wherein the recessed channels manufactured into the portion of the outer surface of each of the plurality of substantially cylindrical elastomeric bushing segments are substantially aligned. The first structure may be, for example, a leaf spring comprising an inner surface having edges defining a scarf gap.

BRIEF DESCRIPTION OF THE DRAWINGS

FIG. 3 is a cross-sectional side view of the elastomeric bushing assembly of FIG. 1 installed in the spring eye of a leaf spring or the like, highlighting the positioning of the spring eye scarf gap protector device of the present invention relative to the scarf gap of the leaf spring or the like; and FIG. 4 is a flow chart of one embodiment of a method for providing an elastomeric bushing assembly incorporating a spring eye scarf gap protector device and installing the elastomeric bushing assembly in the spring eye of a leaf spring or the like.

DETAILED DESCRIPTION OF THE INVENTION

As described above, the spring eye scarf gap protector device of the present invention incorporates a rigid member into the elastomeric bushing. This rigid member, which may be made of a metal, such as steel, a plastic, a composite material, or the like, securely engages one or more recesses manufactured into the bushing. For example, the rigid member may be "snapped" or press-fit into and/or bonded with the one or more recesses. The resulting elastomeric bushing assembly may then be shipped to a customer or the like with the rigid member in place and installed into the spring eye of a leaf spring or the like. Upon installation, the elastomeric bushing bulges, accommodating the volume or space between an inner member or structure and the inner diameter of the spring eye. Advantageously, the elastomeric material adjacent to the rigid member applies compressive force to the rigid member, pushing it against the scarf gap of the spring eye. Thus, there is no elastomeric material in contact with the sharp, irregular edges of the scarf gap, preventing abrading or damage to the elastomeric bushing assembly.

Figure 1:
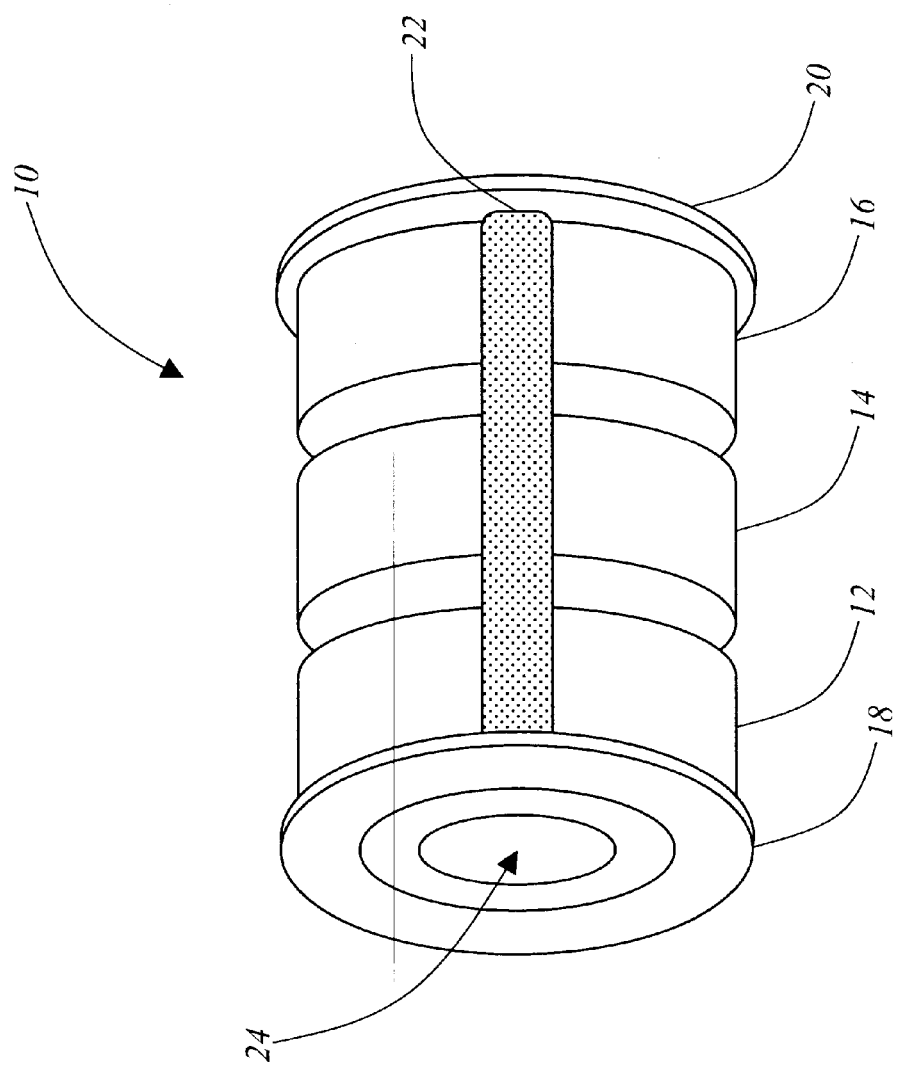
FIG. 1 is a perspective view of one embodiment of the elastomeric bushing assembly of the present invention, incorporating the spring eye scarf gap protector device of the present invention.
Figure 2:
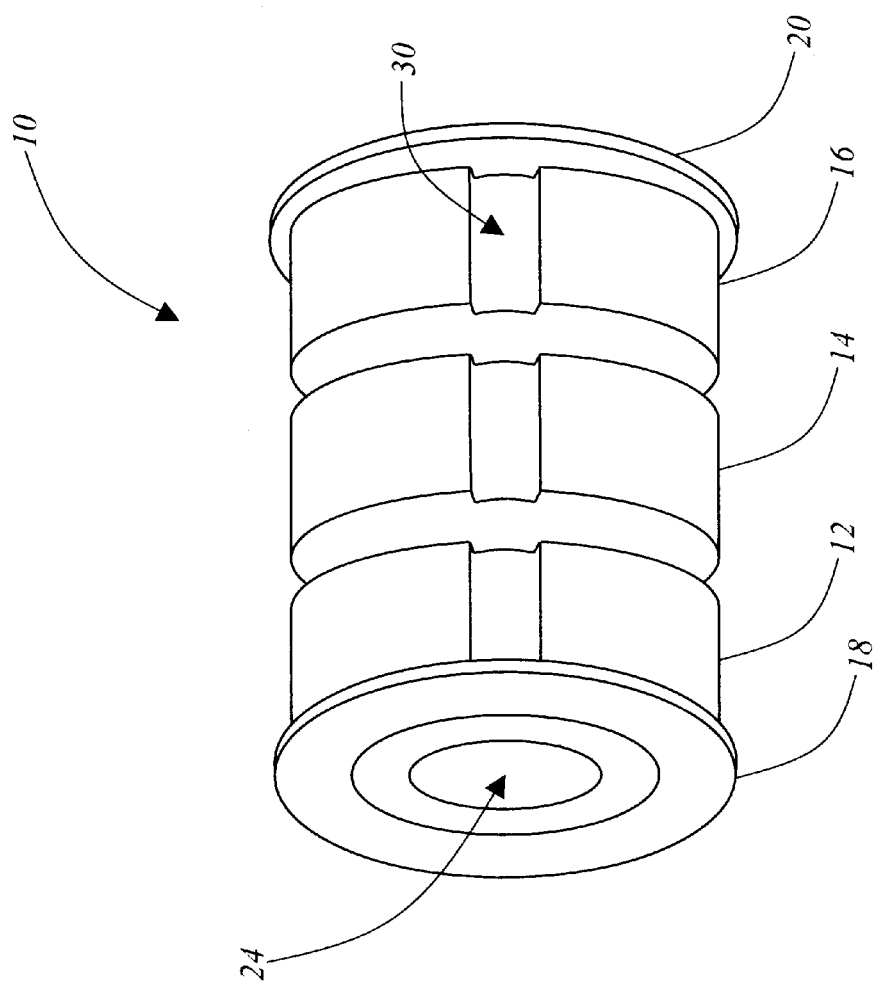
FIG. 2 is another perspective view of the elastomeric bushing assembly of FIG. 1, highlighting one or more recesses operable for receiving the spring eye scarf gap protector device of the present invention.

Referring to FIG. 1, in one embodiment of the present invention, the elastomeric bushing assembly 10 includes a plurality of adjacent, spaced-apart, substantially cylindrical (e.g., puck-shaped) elastomeric bushing segments 12,14,16 joined by a plurality of substantially cylindrical (e.g., puck or hourglass-shaped) elastomeric connecting segments (not shown). The plurality of elastomeric bushing segments 12,14,16 terminate in a plurality of substantially cylindrical (e.g., disc-shaped) elastomeric end segments 18,20. Although a plurality of elastomeric bushing segments 12,14,16 are shown and described herein, the body of the elastomeric bushing assembly 10 may consist of a single substantially cylindrical (e.g., barrel-shaped) elastomeric bushing segment or the like. Preferably, a recessed channel 30 (FIG. 2) is manufactured into a portion of the surface of each of the plurality of elastomeric bushing segments 12,14,16 or, alternatively, a portion of the surface of the single elastomeric bushing segment. The recessed channel 30 is operable for receiving and securely engaging a rigid member 22 having a substantially rectangular or arcuate cross-sectional shape. As described above, the rigid member 22 may be made of a metal, such as steel, a plastic, a composite material, or the like. The rigid member 22 may be "snapped" or press-fit into and/or bonded with the recessed channel 30. Preferably, a hole 24 runs through the center of, and is concentrically aligned with, the plurality of elastomeric bushing segments 12,14,16 or, alternatively, the single elastomeric bushing segment. The hole 24 is operable for receiving an inner member or structure (not shown).

Figure 3:
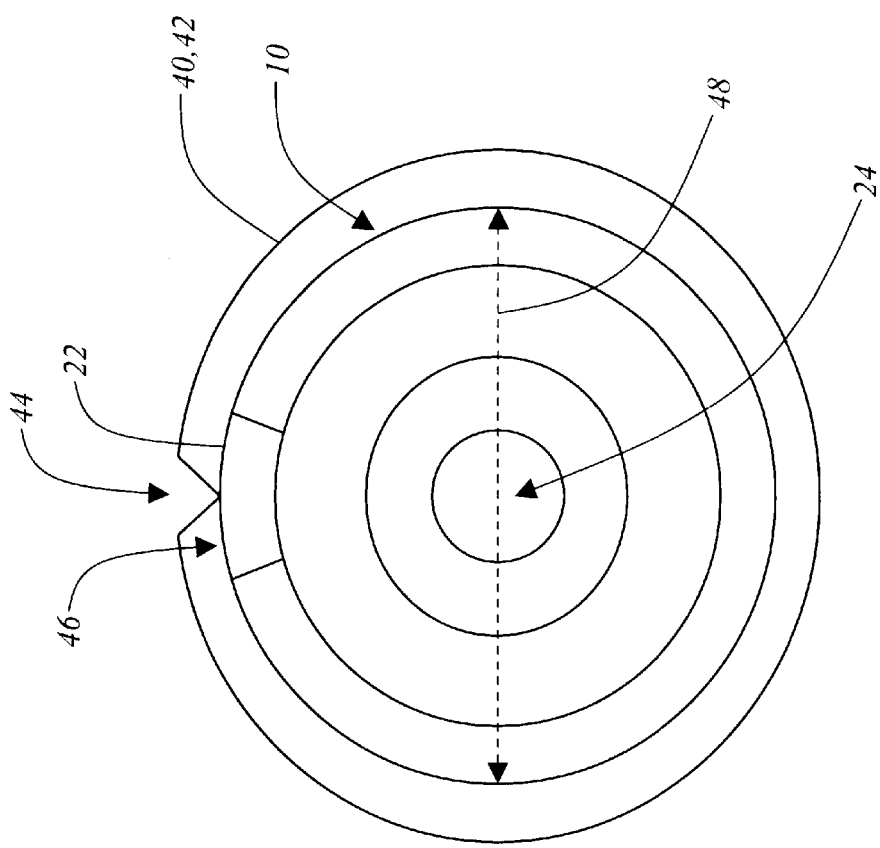

Referring to FIG. 3, upon installation in the spring eye 40 of a leaf spring 42 or the like, the elastomeric bushing assembly 10 of the present invention is positioned such that the rigid member 22 is substantially aligned with the scarf gap 44 of the leaf spring 42 or the like. Preferably, the surface 46 of the rigid member 22 is in direct contact with the sharp, irregular edges of the scarf gap 44, thereby protecting the elastomeric material of the elastomeric bushing assembly 10. As described above, upon installation, the elastomeric material bulges, accommodating the volume or space between the inner member or structure (not shown) and the inner diameter 48 of the spring eye 40. Advantageously, the elastomeric material adjacent to the rigid member 22 applies compressive force to the rigid member 22, pushing it against the scarf gap 44 of the spring eye 40 and holding it in place. Thus, there is no elastomeric material in contact with the sharp, irregular edges of the scarf gap 44, preventing abrading or damage to the elastomeric bushing assembly 10.

Figure 4:
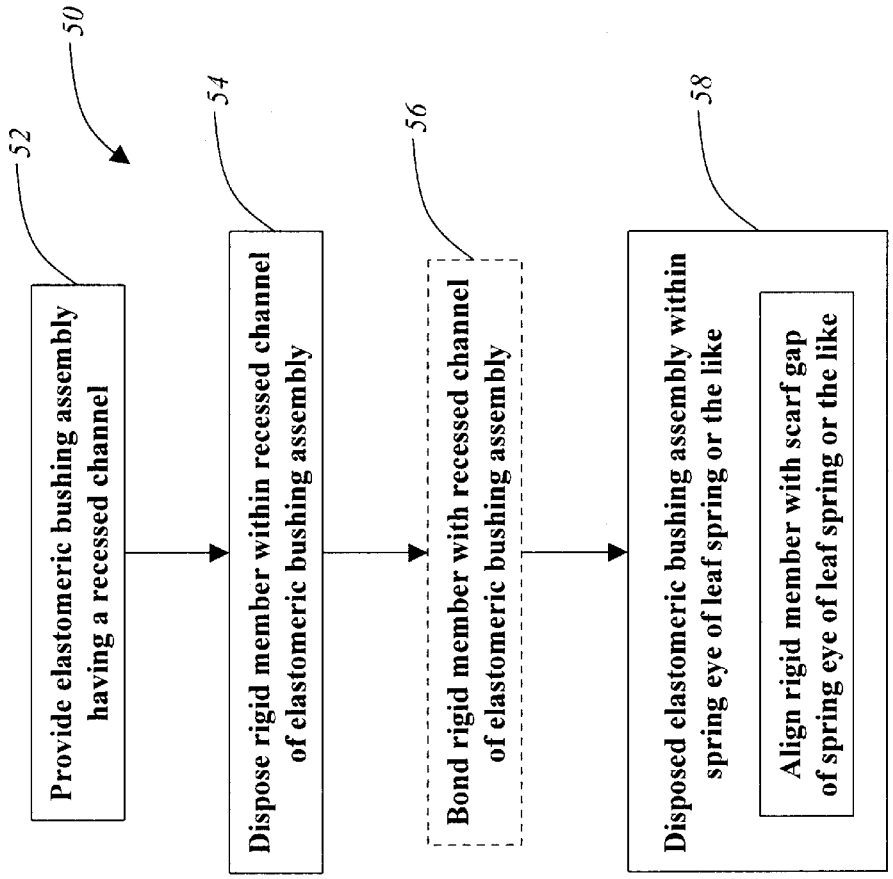

Referring to FIG. 4, in another embodiment of the present invention, a method 50 for providing an elastomeric bushing assembly 10 (FIGS. 1–3) incorporating a spring eye scarf gap protector device and installing the elastomeric bushing assembly 10 in the spring eye 40 (FIG. 3) of a leaf spring 42 (FIG. 3) or the like includes providing an elastomeric bushing assembly 10 having a recessed channel 30 (FIG. 2) (Block 52). A rigid member 22 (FIGS. 1 and 3) is then disposed within the recessed channel 30 of the elastomeric bushing assembly 10 (Block 54). Optionally, the rigid member 22 is bonded with the recessed channel 30 of the elastomeric bushing assembly 10 (Block 56). The elastomeric bushing assembly 10 is then disposed within the spring eye 40 of a leaf spring 42 or the like (Block 58), with the rigid member 22 substantially aligned with the scarf gap 44 (FIG. 3) of the spring eye 40 of the leaf spring 42 or the like.

Although the spring eye scarf gap protector device, the associated elastomeric bushing assembly, and the associated methods of the present invention have been described with reference to preferred embodiments and examples thereof, it will be readily apparent to those of ordinary skill in the art that other embodiments and examples may perform similar functions and/or achieve similar results. All such equivalent embodiments and examples are within the spirit and scope of the present invention and are intended to be covered by the following claims.

What is claimed is:

1. An elastomeric bushing assembly, comprising:
    a substantially cylindrical elastomeric bushing segment having a recessed channel manufactured into a portion of an outer surface thereof;
    a rigid member disposed within the recessed channel manufactured into the portion of the outer surface of the substantially cylindrical elastomeric bushing segment;

wherein the substantially cylindrical elastomeric bushing segment is configured such that it may be disposed within a first structure comprising an inner surface having edges defining a gap; and wherein the substantially cylindrical elastomeric bushing segment is configured such that it may receive a second structure comprising an outer surface.

2. The elastomeric bushing assembly of claim 1, further comprising a plurality of substantially cylindrical elastomeric bushing segments each having a recessed channel manufactured into a portion of an outer surface thereof, wherein the recessed channels manufactured into the portion of the outer surface of each of the plurality of substantially cylindrical elastomeric bushing segments are substantially aligned.

3. The elastomeric bushing assembly of claim 2, wherein the rigid member is disposed within the recessed channel manufactured into the portion of the outer surface of each of the substantially cylindrical elastomeric bushing segments.

4. The elastomeric bushing assembly of claim 2, further comprising a plurality of substantially cylindrical elastomeric connecting segments disposed between the plurality of substantially cylindrical elastomeric bushing segments.

5. The elastomeric bushing assembly of claim 1, wherein the rigid member comprises a material selected from the group consisting of a metal, a plastic, and a composite material.

6. The elastomeric bushing assembly of claim 1, wherein the substantially cylindrical elastomeric bushing segment is configured such that it may be disposed within the first structure comprising the inner surface having edges defining the gap such that the rigid member is substantially aligned and in direct contact with the edges defining the gap.

7. The elastomeric bushing assembly of claim 1, further comprising a plurality of substantially cylindrical elastomeric end segments.

8. The elastomeric bushing assembly of claim 1, wherein the first structure comprises a leaf spring comprising an inner surface having edges defining a scarf gap.

9. A spring assembly, comprising:

a first structure comprising an inner surface having edges defining a gap;

a substantially cylindrical elastomeric bushing segment disposed within the inner surface of the first structure, the substantially cylindrical elastomeric bushing segment having a recessed channel manufactured into a portion of an outer surface thereof; and a rigid member disposed within the recessed channel manufactured into the portion of the outer surface of the substantially cylindrical elastomeric bushing segment, wherein the rigid member is substantially aligned and in direct contact with the edges of the inner surface of the first structure defining the gap.

10. The spring assembly of claim 9, further comprising a plurality of substantially cylindrical elastomeric bushing segments disposed within the inner surface of the first structure, the plurality of substantially cylindrical elastomeric bushing segments each having a recessed channel manufactured into a portion of an outer surface thereof, wherein the recessed channels manufactured into the portion of the outer surface of each of the plurality of substantially cylindrical elastomeric bushing segments are substantially aligned.

11. The spring assembly of claim 10, wherein the rigid member is disposed within the recessed channel manufactured into the portion of the outer surface of each of the substantially cylindrical elastomeric bushing segments.

12. The spring assembly of claim 10, further comprising a plurality of substantially cylindrical elastomeric connecting segments disposed between the plurality of substantially cylindrical elastomeric bushing segments.

13. The spring assembly of claim 9, wherein the rigid member comprises a material selected from the group consisting of a metal, a plastic, and a composite material.

14. The spring assembly of claim 9, wherein the substantially cylindrical elastomeric bushing segment is configured such that it may receive a second structure comprising an outer surface.

15. The spring assembly of claim 9, further comprising a plurality of substantially cylindrical elastomeric end segments.

16. The spring assembly of claim 9, wherein the first structure comprises a leaf spring comprising an inner surface having edges defining a scarf gap.

17. A method for providing an elastomeric bushing assembly, comprising the steps of:

providing a substantially cylindrical elastomeric bushing segment;

manufacturing a recessed channel into a portion of an outer surface of the substantially cylindrical elastomeric bushing segment;

disposing a rigid member within the recessed channel manufactured into the portion of the outer surface of the substantially cylindrical elastomeric bushing segment;

configuring the substantially cylindrical elastomeric bushing segment such that it may be disposed within a first structure comprising an inner surface having edges defining a gap; and configuring the substantially cylindrical elastomeric bushing segment such that it may receive a second structure comprising an outer surface.

18. The method of claim 17, further comprising providing a plurality of substantially cylindrical elastomeric bushing segments each having a recessed channel manufactured into a portion of an outer surface thereof, wherein the recessed channels manufactured into the portion of the outer surface of each of the plurality of substantially cylindrical elastomeric bushing segments are substantially aligned.

19. The method of claim 18, further comprising disposing the rigid member within the recessed channel manufactured into the portion of the outer surface of each of the substantially cylindrical elastomeric bushing segments.

20. The method of claim 18, further comprising disposing a plurality of substantially cylindrical elastomeric connecting segments between the plurality of substantially cylindrical elastomeric bushing segments.

21. The method of claim 17, wherein the rigid member comprises a material selected from the group consisting of a metal, a plastic, and a composite material.

22. The method of claim 17, further comprising disposing the substantially cylindrical elastomeric bushing segment within the first structure comprising the inner surface having edges defining the gap such that the rigid member is substantially aligned and in direct contact with the edges defining the gap.

23. The method of claim 17, further comprising providing a plurality of substantially cylindrical elastomeric end segments.

24. The method of claim 17, wherein the first structure comprises a leaf spring comprising an inner surface having edges defining a scarf gap.

* * * * *